(12) United States Patent
Imai

(10) Patent No.: US 8,665,180 B2
(45) Date of Patent: Mar. 4, 2014

(54) IMAGE DISPLAY DEVICE

(75) Inventor: Hiroshi Imai, Tokyo (JP)

(73) Assignee: NEC Corporation, Tokyo (JP)

(*) Notice: Subject to any disclaimer, the term of this patent is extended or adjusted under 35 U.S.C. 154(b) by 462 days.

(21) Appl. No.: 12/529,379

(22) PCT Filed: Feb. 28, 2008

(86) PCT No.: PCT/JP2008/053544
§ 371 (c)(1),
(2), (4) Date: Sep. 1, 2009

(87) PCT Pub. No.: WO2008/108274
PCT Pub. Date: Sep. 12, 2008

(65) Prior Publication Data
US 2010/0019995 A1    Jan. 28, 2010

(30) Foreign Application Priority Data
Mar. 2, 2007 (JP) .................... 2007-053305

(51) Int. Cl.
*G09G 3/00* (2006.01)

(52) U.S. Cl.
USPC ............................. 345/32; 359/613

(58) Field of Classification Search
USPC ......................................... 345/32
See application file for complete search history.

(56) References Cited

U.S. PATENT DOCUMENTS 5,854,706 A * 12/1998 Alb ................... 359/465
6,389,236 B1 * 5/2002 Western ............. 396/324
6,481,851 B1 * 11/2002 McNelley et al. ...... 353/28

FOREIGN PATENT DOCUMENTS

| JP | 2001305312 A | 10/2001 |
|---|---|---|
| JP | 2004054193 A | 2/2004 |
| JP | 2004062099 A | 2/2004 |
| JP | 2006138948 A | 6/2006 |
| JP | 2006276100 A | 10/2006 |
| JP | 2006276101 A | 10/2006 |
| WO | 2005119376 A | 12/2005 |

OTHER PUBLICATIONS

International Search Report for PCT/JP2006/053544 mailed Apr. 8, 2008.
T. Okoshi, "Three dimensional image engineering", Asakura Publishing, Co. Ltd., Jul. 10, 1991, pp. 11-21.

* cited by examiner

*Primary Examiner* — Kevin M Nguyen
*Assistant Examiner* — Kenneth B Lee, Jr.
(74) *Attorney, Agent, or Firm* — Sughrue Mion, PLLC

(57) ABSTRACT

An image display device which includes a plurality of connected image display elements is provided not to cause an image due to the reflection of light beams emitted from one display surface in the other display surface. In an image display device provided with image display elements, each display surface of which is directed toward an observer to display an image, two or more display elements of them display images on the display surfaces, respectively, and one or more display elements of them have a louver film set on the display surfaces, wherein the louver film has a directionality to shield light beams from going to the direction of a display surface that is different from the display surface on which the louver film is set. Thus, the louver film suppresses an image on one display surface so that the image is not reflected in the other display surface.

10 Claims, 7 Drawing Sheets

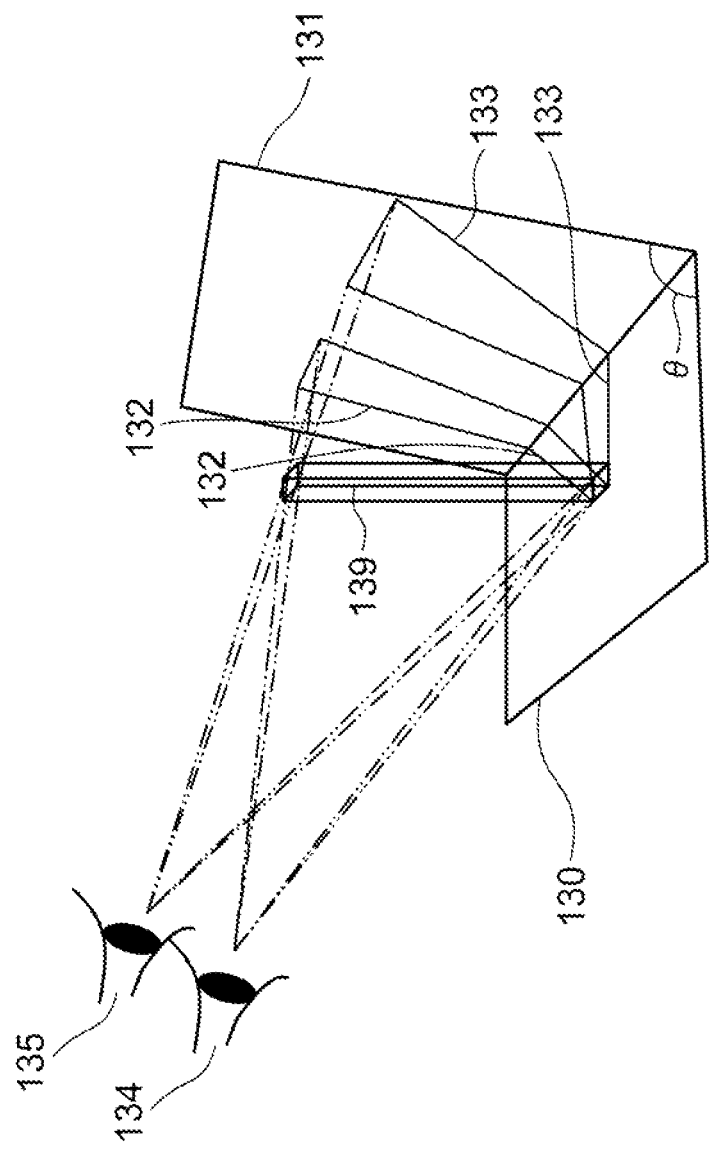

IMAGE DISPLAY DEVICE

This application is the National Phase of PCT/JP2008/053544, filed Feb. 28, 2008, which is based upon and claims priority from Japanese Patent Application No. 2007-053305 filed Mar. 2, 2007, which is incorporated herein in its entirety.

TECHNICAL FIELD

The present invention relates to an image display device having a plurality of image display elements, and each display surface of the image display elements is directed to an observer to display an image thereon.

BACKGROUND ART

In recent years, a stereoscopic display device, which achieves stereo vision by spatially separating a plurality of images with binocular parallax into right and left eyes respectively, by using a lenticular lens, a parallax barrier and the like, is focused on as a stereoscopic display device using a flat-panel display such as a liquid crystal panel. This kind of stereoscopic display device is advantageous in that there is no need to wear special glasses (Non-patent Document 1, for example).

To generate a stereoscopic image for enhancing effect of the stereoscopic vision, there is disclosed a method of displaying the stereoscopic image by transforming an image, using a perspective projection, toward an oblique direction with respect to a visual axis (Patent Document 1). FIG. 5 is a diagram for explaining a method to generate a stereoscopic image. In the method for generating a stereoscopic image shown in FIG. 5, images corresponding to respective viewpoints of right eye 121 and left eye 122 are transformed by the perspective projection into a right eye perspective projection transformation image 123 and a left eye perspective projection transformation image 124, to be projected on the image display surface 125. In that case, the right eye perspective projection transformation image 123 and the left eye perspective projection transformation image 124 are projected, in the oblique direction with respect to the view axis, on the image display surface 125. When the stereoscopic display is performed using the above method, an observer perceives a stereoscopic image 126. At this time, each part of the projected image of the stereoscopic image 126 has different distance from an observing point of the observer in the image display surface 125, therefore the observer does not become conscious of the image display surface. It is effective to reduce eye strain of the observer caused by binocular stereo vision. In addition, a wide angle of view, which can be obtained by the above method, further enhances effect of the stereoscopic vision. As a result, a more realistic stereoscopic image can be provided.

FIG. 6 is a diagram illustrating a stereoscopic display device in which two or more image display elements are connected. In order to provide a stereoscopic display device having a wider angle of view by using image display elements 130 and 131, two or more image display elements 130 and 131 need to be connected so that the angle θ between the image display elements 130 and 131 becomes more than 90 degrees and less than 180 degrees. The stereoscopic image display elements 130 and 131 display a right eye perspective projection transformation image 132 and a left eye perspective projection transformation image 133 thereon, where the images are observed by an observer with his/her right eye 134 and left eye 135 at these respective viewpoints. As a result, the observer can observe a stereoscopic image 139 at wide angle of view, which leads to observation of a realistic stereoscopic image.

Non-patent Document 1: "Three-dimensional Image Engineering" by Takanori Okoshi, Asakura Publishing Co., Ltd. P. 11-21

Patent Document 1: U.S. Pat. No. 6,389,236

Patent Document 2: Japanese Patent Application Laid-open No. 2004-054193

Patent Document 3: Japanese Patent Application Laid-open No. 2001-305312

DISCLOSURE OF THE INVENTION

Problems to be Solved by the Invention

However, in the image display device in which two or more image display elements are connected to each other, there is a problem that light beams emitted from the display surface of one image display element is reflected on the display surface of the other image display element. Hereinafter, an image of one display surface which is reflected on the other display surface is defined as "a reflection image".

FIG. 7 is a diagram for explaining light reflection from a display surface. In FIG. 7[A], light beams that are emitted from a pixel A on the stereoscopic image element 130 and traveling in an observing direction 141 include a light beam reflected from a surface of the stereoscopic image element 131, other than a light beam directly traveling from the pixel A. Due to this light beam, a reflection image 143 of the element A is observed by an observer 140. Similarly, in FIG. 7[B], the light beams that are emitted from an element B on the stereoscopic image element 131 and traveling in the observation direction 141 include a light beam reflected on the surface of the stereoscopic image element 130. Due to this light beam, a reflection image 145 of the element B is observed by the observer 140.

As described above, the reflection images caused by a reflected light beam emitted from one display surface and reflected on the other display surface accounts for a problem of visibility degradation, and also for the following problem. When an observer recognizes a stereoscopic image, a false stereoscopic image generated by the reflection images on both display surfaces is observed at the same time. That brings discomfort to the observer.

Further, Patent documents 2 and 3 disclose an image display device using a louver film. By the way, the image display device disclosed in Patent Document 2 achieves stereo vision by parallax caused by spatially separating an image to the right eye and left eye of an observer by the louver film. Meanwhile, in the image display device indicated in Patent Document 3, reduction in luminance caused by the louver film is prevented by a polarizing film.

The structure of the louver film disclosed in Patent Documents 2 and 3 cannot avoid the reflection of the images between the display surfaces.

It is therefore an object of the present invention to provide an image display device which is capable of preventing an image of one display surface from reflecting on the other display surface.

Means for Solving the Problems

In order to achieve such an object, an image display device according to the present invention is an image display device which displays an image by combining two or more image display elements, wherein the two or more image display elements display the image on respective display surfaces; the one or more image display elements include a louver film on the display surfaces; and the louver film has directional characteristics for shielding light beams traveling in the direction toward the display surface which is different from the display surface having the louver film.

Effects of the Invention

According to the present invention, an image is displayed on the display surfaces of two or more image display elements, and light beams travelling in a direction toward the different display surface are shielded by using the louver film. Consequently, the reflection of the image on the display surface can be prevented.

DESCRIPTION OF EXEMPLARY EMBODIMENTS

Next, exemplary embodiments of the invention will be explained with reference to the drawings.

The exemplary embodiment of the invention is targeting for an image display device in which two or more image display elements (1, 2) are combined so as to display an image. The exemplary embodiment will be concretely explained by taking a case with a combination of the image display elements 1 and 2 as an example. Two image display elements 1 and 2 shown in FIG. 1 display images on the display surfaces 1a and 2a respectively. In the case of displaying the image on the display surfaces 1a and 2a, the following cases are included: one case is that a parallax image for a viewpoint is spatially separated to be displayed, that is, the image is displayed stereoscopically; and the other case is that a two-dimensional image is displayed on the display surfaces 1a and 2a. "A parallax image for a viewpoint is spatially separated" means that the image is separated into images for observer's right eye and left eye to be displayed on the display surfaces 1a and 2a of the image display elements 1 and 2 respectively, when a point 13 is a viewpoint of the observer. Specifically, when the display surface of the horizontal image display element 1 is an X axis display surface 1a and the display surface of the vertical image display element 2 is a Y axis display surface 2a in FIG. 1, the parallax image for the viewpoint 13 is spatially separated as shown in FIG. 2. That is, the parallax image is separated into a right eye image 4R and a left eye image 4L to be displayed from the X axis display surface 1a to the Y axis display surface 2a. Further, the two-dimensional image is displayed from the X axis display surface 1a to the Y axis display surface 2a.

Hereinafter, the case that an image for a viewpoint is spatially separated and displayed on the display surface will be explained as an example. As shown in FIG. 1 and FIG. 2, when the observer observes the image displayed on the X-axis display surface 1a and the Y-axis display surface 2a with both eyes fixed on the viewpoint 13, the observer observes the right eye image 4R displayed on the X-axis display surface 1a and the Y-axis display surface 2a with the right eye, and observes the left eye image 4L displayed on the X-axis display surface 1a and the Y-axis display surface 2a with the left eye. Therefore, the right eye image 4R and the left eye image 4L displayed on the X-axis display surface 1a and the Y-axis display surface 2a are synthesized at the position of a surface A'-B', and the observer observes it as one image 5. In this case, by providing an optical system for displaying stereoscopic image, such as a lenticular lens, a parallax barrier, a lens array or a pinhole array for integral photography, on the X-axis display surface 1a and the Y-axis display surface 2a, it becomes possible to display the image 5 within the surface A'-B' stereoscopically. Further, in the case of not using the optical system for displaying stereoscopic image, the image 5 within the surface A'-B' can be displayed as a two-dimensional image.

As the basic configuration of the image display device according to the exemplary embodiment of the invention, the one or more image display elements (1, 2) include louver films 6 and 7 on their surfaces, and the louver films 6 and 7 have directional characteristics for shielding light beams travelling in the direction toward the display surface which is different from the display surface having the louver films 6 and 7.

An explanation will be made based on an example shown in FIG. 1. In the case of applying the louver film 6 on the display surface 1a of the image display element 1, the louver film 6 shields the light beam leaking from the display surface 1a to be reflected on the other display surface 2a. In the case of applying the louver film 7 on the display surface 2a of the image display element 2, the louver film 7 shields the light beam leaking from the display surface 2a to be reflected on the other display surface 1a. In the case of applying the louver films 6 and 7 on the display surfaces 1a and 2a of the image display elements 1 and 2 respectively, the louver film 6 shields the light beam leaking from the display surface 1a to be reflected on the other display surface 2a, and the louver film 7 shields the light beam leaking from the display surface 2a to be reflected on the other display surface 1a.

Therefore, according to the exemplary embodiment of the invention, since a parallax image for a viewpoint is spatially separated and displayed on the display surfaces of two or more image display elements, and the light beams travelling in a direction toward the different display surface are shielded by using a louver film, it is possible to prevent the image from reflecting on the display surface.

Moreover, the case that the louver films 6 and 7 are applied to the display surfaces 1a and 2a of the image display elements 1 and 2 will be explained using the example in FIG. 1. In the case of applying the louver films 6 and 7 to the display surfaces 1a and 2a of two image display elements 1 and 2 respectively, it is preferable that the louver films 6 and 7 have directional characteristics in the same direction on both display surfaces 1a and 2a of the image display elements 1 and 2. "Having directional characteristics in the same direction" will be explained more specifically using the example in FIG. 1. In the case where, when an angle of view 14 at the viewpoint 13 is 10 degrees, the directional characteristics of the louver film 6 applied to the display surface 1a is the characteristics in which total angle is 30 degrees and it is in the left-obliquely upward direction, and the directional characteristics of the louver film 6 applied to the other display surface 2a is the characteristics in which total angle is also 30 degrees and it is in the right-obliquely upward direction. In other words, "having directional characteristics in the same direction" means that the total angles of the louver films 6 and 7 applied to the display surfaces 1a and 2a are the same or substantially the same, and the directions thereof are the same or substantially the same and do not cross each other at the position of the viewpoint 13.

As described above, according to the exemplary embodiment of the invention, if the louver film has directional characteristics in the same direction on any display surfaces of the image display elements, it is possible to prevent the light beams emitted from the display surfaces from interfering mutually, to prevent an image from reflecting on the display surface surely, and to display a realistic stereoscopic image without discomfort when the image is to be displayed stereoscopically.

Next, an example in which the stereoscopic image 5 is displayed by using an image display element capable of displaying an image stereoscopically as the image display elements 1 and 2 will be explained as a first exemplary embodiment of the invention.

Firstly, the outline will be explained. The image display device of this exemplary embodiment includes two image display elements 1 and 2 and displays the images on respective display surfaces 1a and 2a of the image display surfaces 1 and 2 by directing the respective display surfaces 1a and 2a toward the viewpoint 13. The louver films 6 and 7 having directional characteristics for directing light beams for displaying the image toward the viewpoint 13 are provided at the front surfaces of the respective display surfaces 1a and 2a. The front surfaces of the display surfaces 1a and 2a mean a surface on the side of the viewpoint 13, that is, a surface on the opposite side of the surface to which backlights 11 and 12 are arranged.

Without the louver films 6 and 7, when respective display surfaces 1a and 2a are directed toward the viewpoint 13, a reflection image, which is caused by the reflection of the image of the display surfaces 1a and 2a from one side to the other side, is seen from the side of the viewpoint 13.

In this exemplary embodiment, light beam emitted from one side of the display surfaces 1a and 2a is directed toward the side of the viewpoint 13 by the directional characteristics of the louver films 6 and 7. Consequently, it prevents the light beam from being directed toward the other side of the display surfaces 1a and 2a. Therefore, the image of one side of the display surfaces 1a and 2a is prevented from reflecting on the other side of the display surfaces 1a and 2a.

The display surfaces 1a and 2a are both rectangular, contact with each other at the one side and are arranged in an elevating direction. Here, the elevating direction means a vertical direction along which the eyes of the observer move by centering on the viewpoint 13. When both display surfaces 1a and 2a are contact with each other at the one side, the display surfaces 1a and 2a become continuous, thereby the image is given depth, that is, the display surface is given a stereoscopic appearance. Further, when the display surfaces 1a and 2a are contact with each other at the one side, it means that the display surfaces 1a and 2a are at the closest point to each other. The closer to each other the display surfaces 1a and 2a are, the more pronounced the reflection of the image from one side to the other side becomes, because a solid angle seen from one side to the other side enlarges. Therefore, the effects of the present invention will be pronounced. Moreover, as all directional characteristics of the louver films 6 and 7 are in the same direction, the light beams travelling from one side to the other side of the display surfaces 1a and 2a are suppressed considerably. Therefore, the reflection image is also suppressed considerably. The angle $\theta$ between the display surfaces 1a and 2a is 90 degrees, which is not limited thereto.

Further, the details will be explained. The image display device of the exemplary embodiment includes the image display elements 1 and 2. The louver films 6 and 7 are attached to the display surfaces 1a and 2a of the image display elements 1 and 2. The louver films 6 and 7 have directionality for emitting the light beam within the angle of view 14 observed from the viewpoint 13. The light beam from an element A on the display surface 1a is not emitted in the direction of the display surface 2a. Therefore, the image of the element A does not reflect on the display surface 2a. Similarly, the light beam from an element B on the display surface 2a is not emitted in the direction of the display surface 1a. Therefore, the image of the element B does not reflect on the display surface 1a. Consequently, only the light beam passing through a point A' and a point B' which form the stereoscopic image 5 reaches the viewpoint 13. Thereby, a false stereoscopic image caused by the reflection image is not observed from the viewpoint 13.

The directionalities of the louver films 6 and 7 are obtained by a common manufacturing technology of a louver film. For example, a transparent film including straight patterns made of material which reflects or absorbs the light may be laminated so that the straight patterns shift slightly each other. For giving the directionality of 45 degrees with respect to the surface of the louver film, respective straight patterns are laminated so as to line up at an angle of 45 degrees with respect to the surface of the louver film. Further, it is possible to design the degree of sharpness of directionality by arranging the spaces between the straight patterns or the number of laminations of the transparent films. Needless to say, lattice patterns may be used instead of the straight patterns.

FIG. 2 is a diagram showing an entire configuration for displaying a stereoscopic image by using the first exemplary embodiment of the invention. In FIG. 2, the image display elements 1 and 2 include the rectangular display surfaces 1a and 2a, and the display surfaces 1a and 2a are connected at an angle $\theta$ of 90 degrees, for example.

The image display elements 1 and 2 include a lenticular lens (not shown) attached to liquid crystal panel display surfaces 21a and 22a, as an optical system which becomes a part of a stereoscopic image displaying unit. Further, the louver films 6 and 7 are arranged on the lenticular lens.

For the image display elements 1 and 2, color liquid crystal panels having 640 horizontal pixels by 480 vertical pixels, and 32 mm horizontal by 50 mm vertical in screen sizes were used. The lens pitch of the lenticular lens was 100 μm, and the number of lenses was 320. A distance for observation between the viewpoint 13 and the image display elements 1 and 2 was 400 mm, and angle of view (referred to FIG. 1) was set at 10 degrees. The angle of louver of the louver films 6 and 7 was set to 45 degrees, and the directionalities of the louver films 6 and 7 were total angle of 30 degrees. Under the above condition, when displaying the images corresponding to a right eye 13R and a left eye 13L of the observer at the viewpoint 13, at an observing angle of 45 degrees on the display surfaces 1a and 2a optically and independently, the stereoscopic vision with naked eyes was achieved without special glasses and the like. Further, because of functions of the louver films 6 and 7, the observer obtained the stereoscopic view without perceiving a false stereoscopic image caused by a reflection image among two display surfaces 1a and 2a.

Moreover, the image display elements 1 and 2 according to the first exemplary embodiment of the invention includes an image processing circuit 27 which becomes a part of the stereoscopic image displaying unit. The image processing circuit 27 transforms a right eye viewpoint image signal 25R and a left eye viewpoint image signal 25L so as to generate a right eye perspective projection image 4R and a left eye perspective projection image 4L, and outputs the data of the images 4R and 4L to the image display elements 1 and 2 respectively. Operation of the image processing circuit 27 enables an observer at the viewpoint 13 to be presented with a geometrically valid stereoscopic image 5 as an animated image in real-time. The image processing circuit 27 makes a closer object displayed as an image having bigger difference in binocular parallax. The image processing circuit 27 is a common circuit for displaying a stereoscopic image, which is well known to those skilled in the art, so the details will be omitted. In this case, a circuit for displaying an image stereoscopically is used as the image processing circuit 27. However, instead of the circuit, an image processing circuit for displaying a two-dimensional image on the display surfaces 1a and 2a may be used.

When an image was displayed on the display surfaces 1a and 2a by the image processing device as described above, a stereoscopic image without a false stereoscopic image caused by a reflection image was presented to the observer, and a stereoscopic display device presenting a realistic image with high level of visibility was provided.

A stereoscopic image is obviously a virtual image. A reflection image is also a virtual image. Therefore, the reflection image is easily mistaken for the stereoscopic image. Display of a stereoscopic image is affected more adversely than display of a plane image is, by the reflection image. Thus, the present invention has a greater effect.

Next, an example which realizes a stereoscopic image display at n viewpoints by making the image display elements 1 and 2 shown in FIGS. 1 and 2 correspond to multi-viewpoint image display will be explained as a second exemplary embodiment of the invention.

For the image display elements 1 and 2, the same color liquid crystal panel as that in the first exemplary embodiment is used. The lens pitch of the lenticular lens (not shown) was 50×n μm, and the number of lenses was 640/n. For example, in the case where the number of viewpoints is n=4, the lens pitch is 200 μm, and the number of lenses is 160. The distance for observation from the viewpoint 13 to the display surface was 400 mm, and an angle of view was set to 10 degrees. The angle of the louver films 6 and 7 was 45 degrees, and the directional characteristics of the louver films 6 and 7 were total angle of 30 degrees. Under this condition, when the images corresponding respective viewpoints from a viewpoint position 1 to a viewpoint position n are displayed on the display surfaces 1a and 2a optically and independently at the observation angle of 45 degrees, the stereoscopic view with naked eyes can be achieved without wearing special glasses and the like. Further, because of functions of the louver films 6 and 7, an observer obtained the stereoscopic view without perceiving a false stereoscopic image caused by a reflection image among display surfaces 1a and 2a.

Moreover, the image display elements 1 and 2 include an image processing circuit 37 which is a part thereof. The image processing circuit 37 transforms a multi-viewpoint image signal 35 from the viewpoint position 1 to the viewpoint position n so as to generate perspective projection images $36_1$ to $36_n$ corresponding to the viewpoint positions 1 to n which correspond to the image display elements 1 and 2 respectively. The image processing circuit 37 outputs the data of these images $36_1$ to $36_n$ to the image display elements 1 and 2 and presents a geometrically valid stereoscopic image 34 as an animated image to the observer in real-time. Note that the images $36_1$ to $36_n$ at the viewpoint positions 1 to n include the right eye image and left eye image of the observer at the viewpoint positions 1 to n.

When an image was displayed on the display surfaces 1a, 2a using the above mentioned image display device, the observer was presented with a stereoscopic image without a false stereoscopic image caused by a reflection mage. Therefore, a stereoscopic display device presenting a realistic image with high level of visibility was provided.

Next, an example which is obtained by modifying the configuration in which the louver film is applied to the display surface of the image display element will be explained as a third exemplary embodiment of the present invention.

As shown in FIG. 4, in this embodiment, the louver films 6 and 7 are applied to the back side of the display surfaces 1a and 2a of the respective image display elements is 1 and 2, so as to be arranged between the image display elements 1 and 2 and backlights 11 and 12. The louver films 6 and 7 have directional characteristics only within the angle of view 14 which is observed at the viewpoint 13.

In the embodiment, light beams from the backlights 11 and 12 are deflected from the front side to the direction of total angle of 30 degrees by the directional characteristics of the louver films 6 and 7, for example, and are irradiated to the image display elements 1 and 2. The image display elements 1 and 2 display images on the display surfaces 1a and 2a by the incidence of the light beams transmitted through the louver films 6 and 7 from the backlights 11 and 12. In this case, as the light beams restricted by the directional characteristics of the louver films 6 and 7 are incident, the direction of light beams emitted from the display surfaces 1a and 2a of the image display elements 1 and 2 is also restricted by the directional characteristics of the louver films 6 and 7. Therefore, the incidence of the light beams from one side of the display surfaces 1a and 2a to the other side of the display surfaces 2a and 1a is restricted, thereby, the reflection of the image is avoided.

According to the embodiment described above, as the reflection of the image between the display surfaces of the image display elements 1 and 2 is avoided by the louver films, it is possible to provide a stereoscopic image without a false stereoscopic image caused by the reflection image to the observer, as well as in the first and second exemplary embodiments.

In FIG. 4, a transmissive color liquid crystal panel is used as the image display elements 1 and 2, and a white LED is used as the backlights 11 and 12, which is not limited thereto. For the backlights 11 and 12, various light sources such as a cold cathode fluorescent lamp, a laser or the like other than the white LED may be used. Further, by using a monochrome liquid crystal panel without a color filter for the image display elements 1 and 2 and using LEDs or lasers of red, green and blue which can modulate images for the backlights 11 and 12, and then by combining the monochrome liquid crystal panel and the backlight, an image may be color-displayed on the display surface of the image display element.

Two image display elements are combined at an opening angle θ of 90 degrees, which is not limited thereto. The opening angle θ may be set within a range from 90 degrees to 180 degrees. Further, as the image display element, an image display element for displaying an image stereoscopically is used. However, instead of that, a planar image display element for displaying an image in two-dimensions may be used. In the case of using the image display element for displaying an image in two-dimensions, the opening angle θ of two image display elements may be set to below 90 degrees.

In addition, two image display elements are combined in the above embodiments; however, it is not limited to this, and two or more image display elements may be combined. Further, there is no need to apply the louver film to the display surfaces of all image display elements. The louver film may be applied to only some of the display surfaces. In other words, in the case where the image displayed on one display surface does not reflect on the other display surface, the louver film may be applied to only some of the display surfaces. Moreover, as to the directional characteristics of the louver film, the directivity angle of the louver film applied to the display surface does not always have to be set to the same angle if an image is not reflected between the display surfaces.

Further, a liquid crystal panel, an organic EL panel, a plasma display panel, a surface-conduction electron-emitter display panel, or any other flat display panels can be used as the image display element. A cathode ray tube (CRT) and the like other than a panel may be used, or a panel having the large number of pixels and large display size may be used.

As described above, the present invention has been explained with reference to the embodiments (and the examples). However, the present invention is not limited to the above embodiments (and the examples). As to the configuration and details of the present invention, various modifications that one skilled in the art can understand can be performed within the scope of the present invention.

INDUSTRIAL APPLICABILITY

According to the present invention, it is possible to prevent an image from reflecting between the display surfaces and to display an image having visibility and a realistic sensation in the case of displaying an image stereoscopically.

BRIEF DESCRIPTION OF THE DRAWINGS

FIG. 6 is a diagram illustrating a stereoscopic display device in which two or more image display elements are combined each other.

Figure 1:
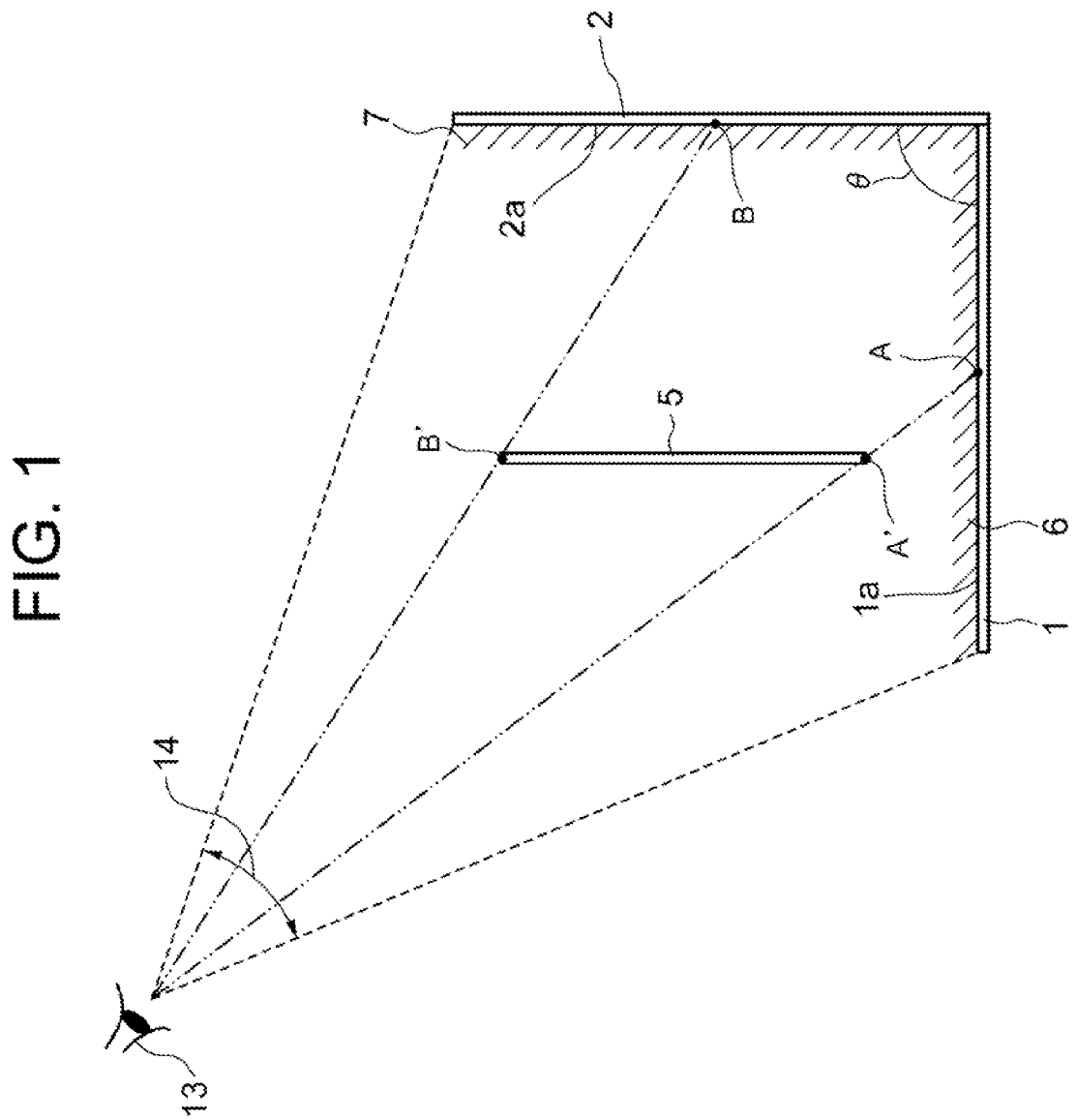
FIG. 1 is a configuration diagram showing a first embodiment of an image display device according to the present invention.
Figure 2:
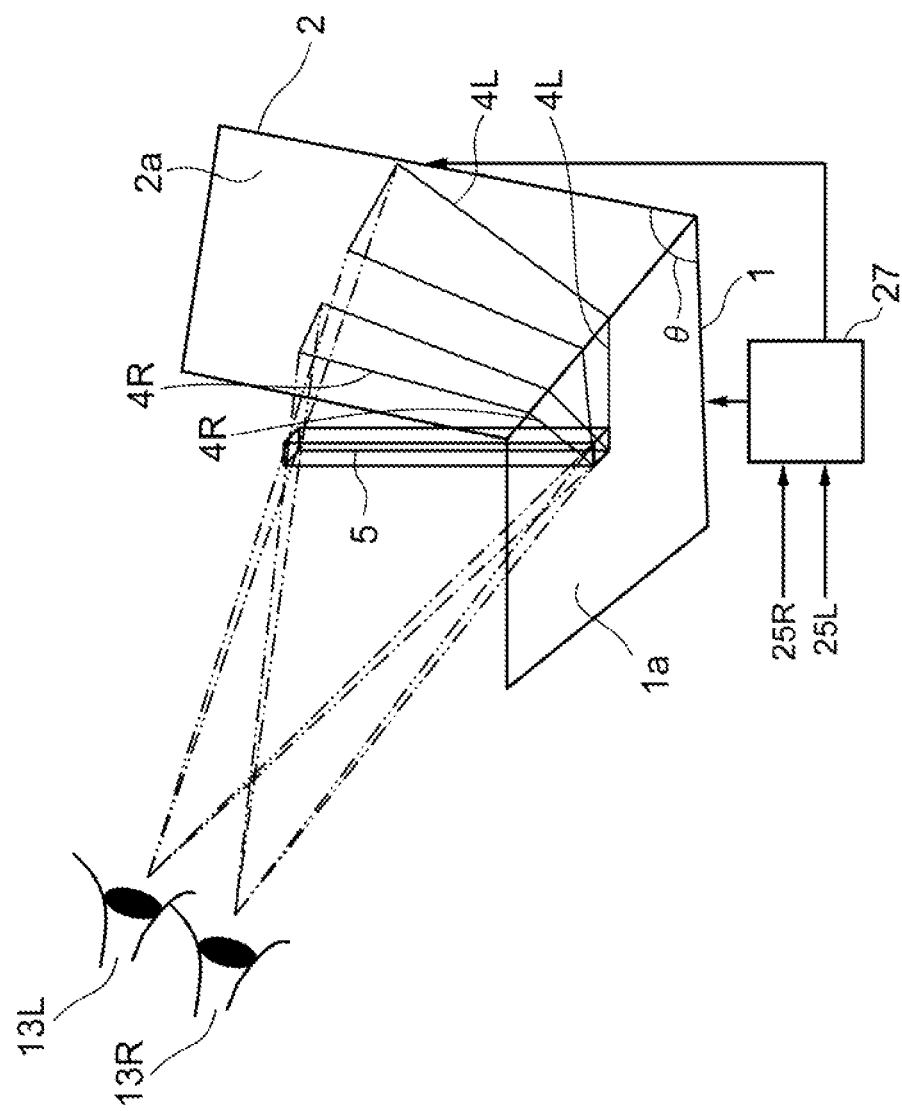
FIG. 2 is an overall configuration diagram showing a first embodiment of the image display device according to the present invention.
Figure 3:
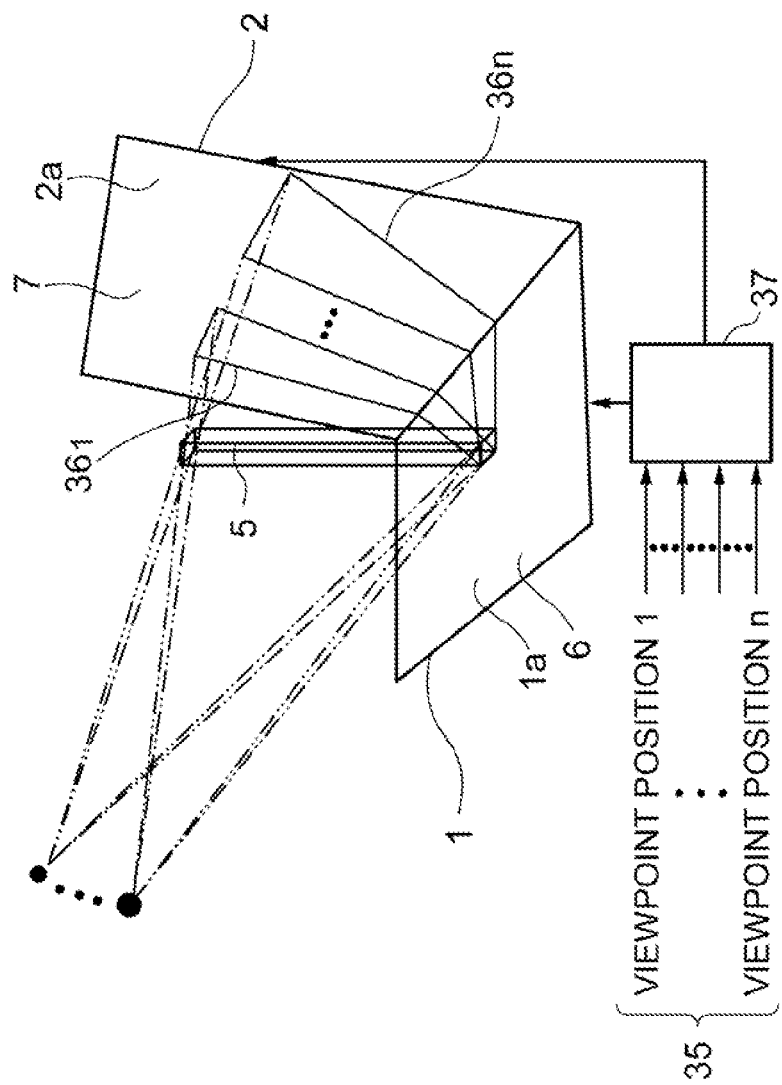
FIG. 3 is a configuration diagram showing a second embodiment of the image display device according to the present invention.
Figure 4:
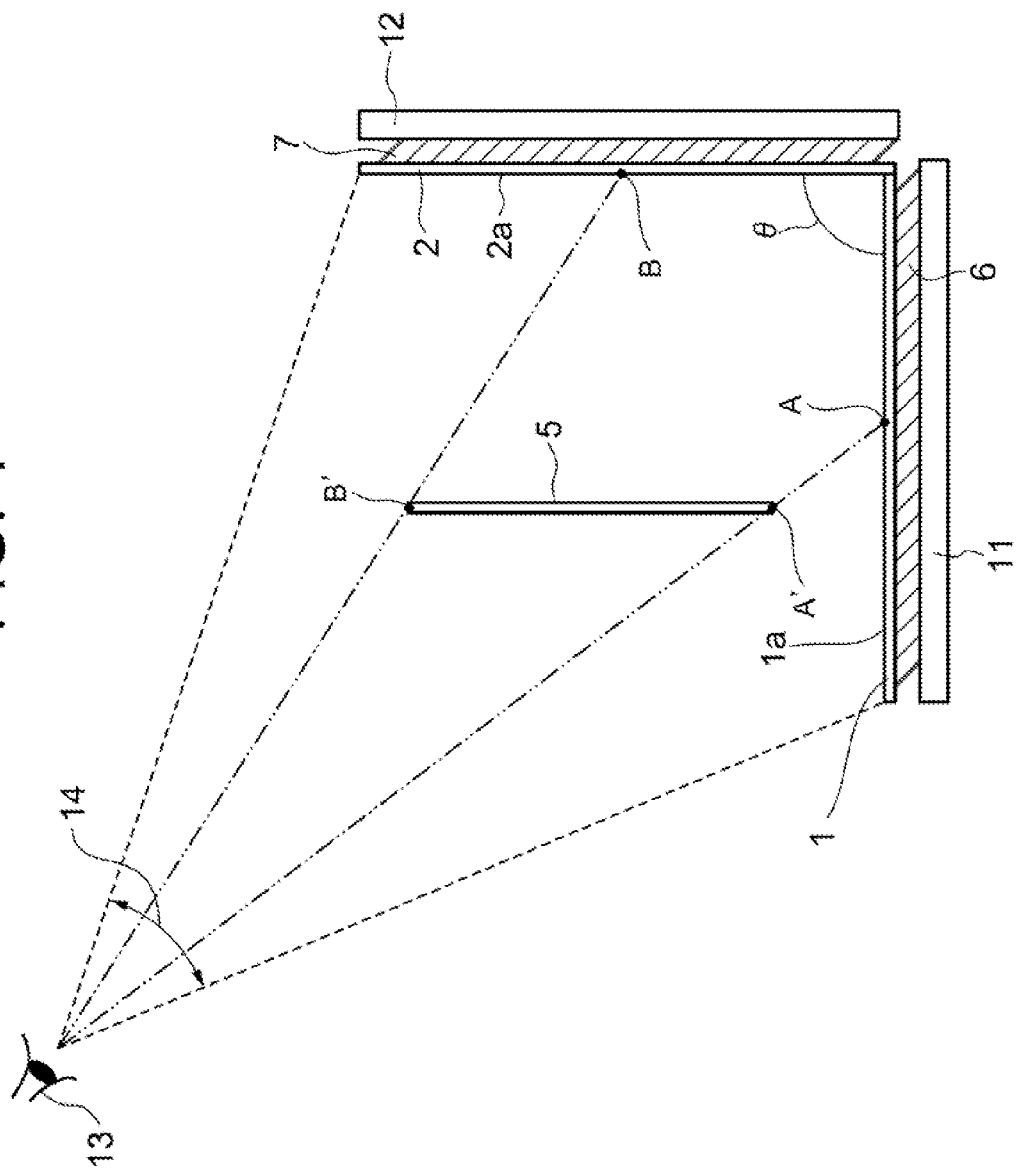
FIG. 4 is a configuration diagram showing a third embodiment of the image display device according to the present invention.
Figure 5:
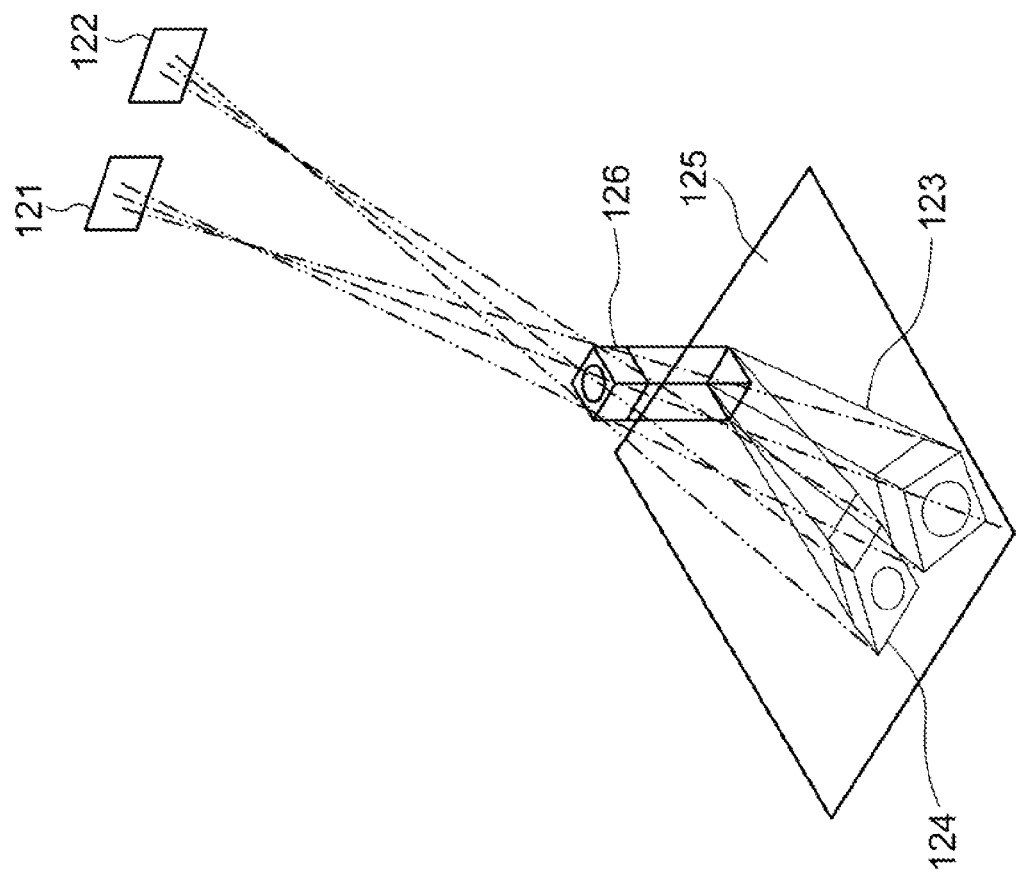
FIG. 5 is a diagram illustrating a method for generating a stereoscopic image in related arts.
Figure 7A:
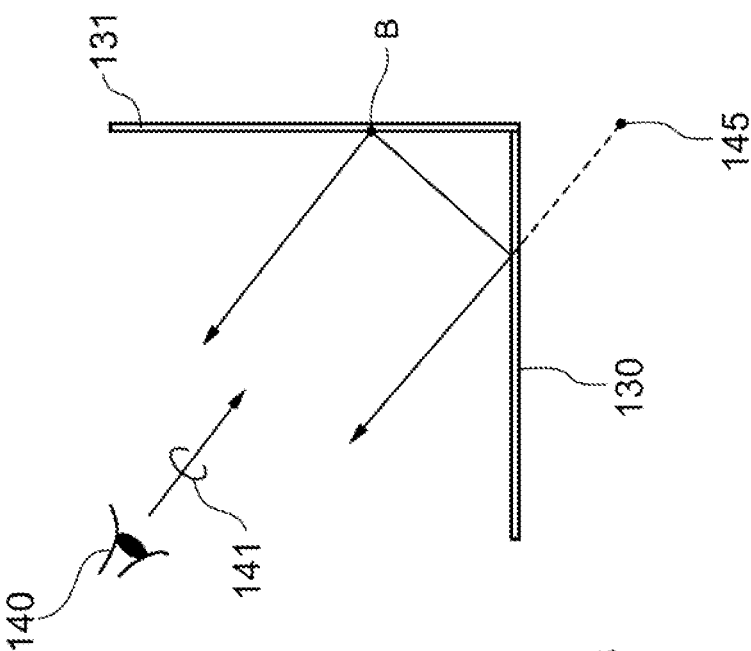
FIG. 7 is a diagram illustrating the reflection of rays on display surfaces.
Figure 7B:
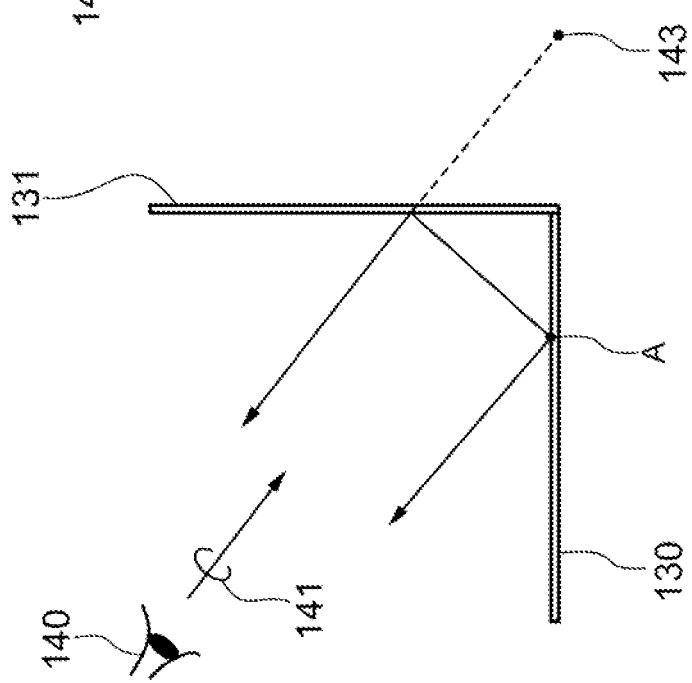

DESCRIPTION OF SYMBOLS 1, 2 image display element
1a, 2a display surface of image display element
6, 7 louver film
11, 12 backlight
27, 37 image processing circuit

What is claimed is:

1. An image display device for displaying an image by combining two or more image display elements, wherein:
   each of the two or more image display elements displays the image on a display surface thereof directly directing the image toward a viewpoint of an observer;
   each of the two or more image display elements include a louver film on the display surfaces;
   the louver film of each of the display surfaces includes a louver,
   the louvers of the one or more image display elements facing a same direction as the louvers of other of the one or more image display elements; and
   the louver film of each of display surfaces has directional characteristics in the same direction on the display surface of any image display element, directional characteristic for leading a light beam by directly directing the beam toward the viewpoint of the observer, and directional characteristics for shielding light beams traveling in the direction toward the display surface which is different from the display surface having the louver film.

2. The image display device as claimed in claim 1, wherein the two or more image display elements including the louver film are arranged in a manner that the respective display surface cross each other.

3. The image display device as claimed in claim 1, wherein the louver film is arranged at a front surface of the display surface of the image display element.

4. The image display device as claimed in claim 1, wherein the louver film is arranged at a front surface of the display surface of the image display element and arranged between the display surface and a backlight.

5. The image display device as claimed in claim 1, wherein the two or more image display elements have a processing unit for displaying a stereoscopic image on respective display surfaces by spatially separating a parallax image for a viewpoint.

6. The image display device as claimed in claim 5, wherein the processing unit transforms an image in the parallax direction corresponding to at least two viewpoints into an image corresponding to the positional relation of respective image display elements and projects it.

7. The image display device as claimed in claim 1, wherein the two or more image display elements have a processing unit for displaying a two-dimensional image.

8. The image display device as claimed in claim 1, wherein the two or more image display elements are combined with the display surfaces arranged in an elevating direction.

9. An image display means for displaying an image by combining two or more image display elements, wherein:
   each of the two or more image display elements displays the image on a display surface thereof directly directing the image toward a viewpoint of an observer;
   each of the two or more image display elements include a louver film on the display surfaces;
   the louver film of each of the display surfaces includes a louver,
   the louvers of the one or more image display elements facing a same direction as the louvers of other of the one or more image display elements; and
   the louver film of each of display surfaces has directional characteristics in the same direction on the display surface of any image display element, directional characteristic for leading a light beam by directly directing the beam toward the viewpoint of the observer, and directional characteristics for shielding light beams traveling in the direction toward the display surface which is different from the display surface having the louver film.

10. The image display means as claimed in claim 9, wherein the two or more image display elements including the louver film are arranged in a manner that the respective display surfaces cross each other.

* * * * *